United States Patent
Garcia et al.

(10) Patent No.: US 9,491,338 B1
(45) Date of Patent: Nov. 8, 2016

(54) SEALED ARTICULATING CAMERA FOR A COMMUNICATION DEVICE

(71) Applicant: MOTOROLA SOLUTIONS, INC, Schaumburg, IL (US)

(72) Inventors: Jorge L. Garcia, Plantation, FL (US); Patrick S. Claeys, Pembroke Pines, FL (US)

(73) Assignee: MOTOROLA SOLUTIONS, INC., Schaumburg, IL (US)

( * ) Notice: Subject to any disclaimer, the term of this patent is extended or adjusted under 35 U.S.C. 154(b) by 0 days.

(21) Appl. No.: 14/886,339

(22) Filed: Oct. 19, 2015

(51) Int. Cl.
  *G03B 17/02* (2006.01)
  *H04N 5/225* (2006.01)
  *F16J 15/32* (2016.01)

(52) U.S. Cl.
  CPC ............. *H04N 5/2252* (2013.01); *F16J 15/32* (2013.01); *H04N 5/2259* (2013.01)

(58) Field of Classification Search
  USPC ......... 396/429, 439, 448, 529, 535; 348/373
  See application file for complete search history.

(56) References Cited

U.S. PATENT DOCUMENTS

| | | | |
|---|---|---|---|
| 5,223,996 A | 6/1993 | Read et al. | |
| 7,688,970 B2 | 3/2010 | Garcia et al. | |
| 8,439,191 B1 | 5/2013 | Lu | |
| 2004/0089570 A1 | 5/2004 | Chien et al. | |
| 2013/0034825 A1* | 2/2013 | Phillips | A61B 1/00016 433/29 |
| 2014/0111634 A1* | 4/2014 | Mueckl | G02B 23/2476 348/82 |

OTHER PUBLICATIONS

Garcia et al—U.S. Appl. No. 14/886,568, filed Oct. 19, 2015,—Entitled: "Sealing System and Method for Sealing of Electronics Housings".

* cited by examiner

*Primary Examiner* — Clayton E LaBalle
*Assistant Examiner* — Warren K Fenwick
(74) *Attorney, Agent, or Firm* — Barbara R. Doutre

(57) ABSTRACT

An improved seal assembly for an articulating camera (102) is provided in a communication device (100). The articulating camera (102) a coiled flex circuit (208) and pivot housing (110). The coiled flex circuit (208) provides for range of motion. The coiled flex circuit (208) has a flex extension (218) that threads through a barrel hinge (214) of the pivot housing (110). The barrel hinge (214) and flex extension (218) are sealed via a single seal (306) having a circumferential seal (312) and pocket (308) thereby allowing the coiled flex circuit (208) to continue to provide range of rotation within the pivot housing (110).

18 Claims, 6 Drawing Sheets

SEALED ARTICULATING CAMERA FOR A COMMUNICATION DEVICE

FIELD OF THE INVENTION

The present invention relates generally to communication devices and more particularly to the sealing of cameras for portable communication devices.

BACKGROUND

Today's portable public safety communication devices, for example radios and associated accessories are incorporating additional features, such as body worn camera systems for capturing video. While a combination of wide angle field of view optics and camera articulation features are considered desirable, most body worn camera systems only offer wide angle optics due to concerns with design complexity with the articulating camera system. The results are severely limited wearing positions for these body worn camera systems.

The ability to protect the articulating features of the body worn camera system in rugged environments is critical to maintaining good communications. A communication device having an articulating camera is particularly sensitive to wetness, smoke, dust, and other elements encountered in public safety environments, and thus particular attention must be taken to protect the camera device. Protecting the camera from the environment while maintaining the camera's range of motion is particularly challenging when designing an assembly for a portable device having a limited form factor. Wear and tear, leakage, space, fatigue and rotational drag are all important factors needing consideration along with the need to maintain a good electrical interconnect.

Accordingly, there is a need for a portable communication device with an improved sealed camera assembly. Such an assembly would be particularly beneficial to body worn camera systems.

BRIEF DESCRIPTION OF THE FIGURES

The accompanying figures where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
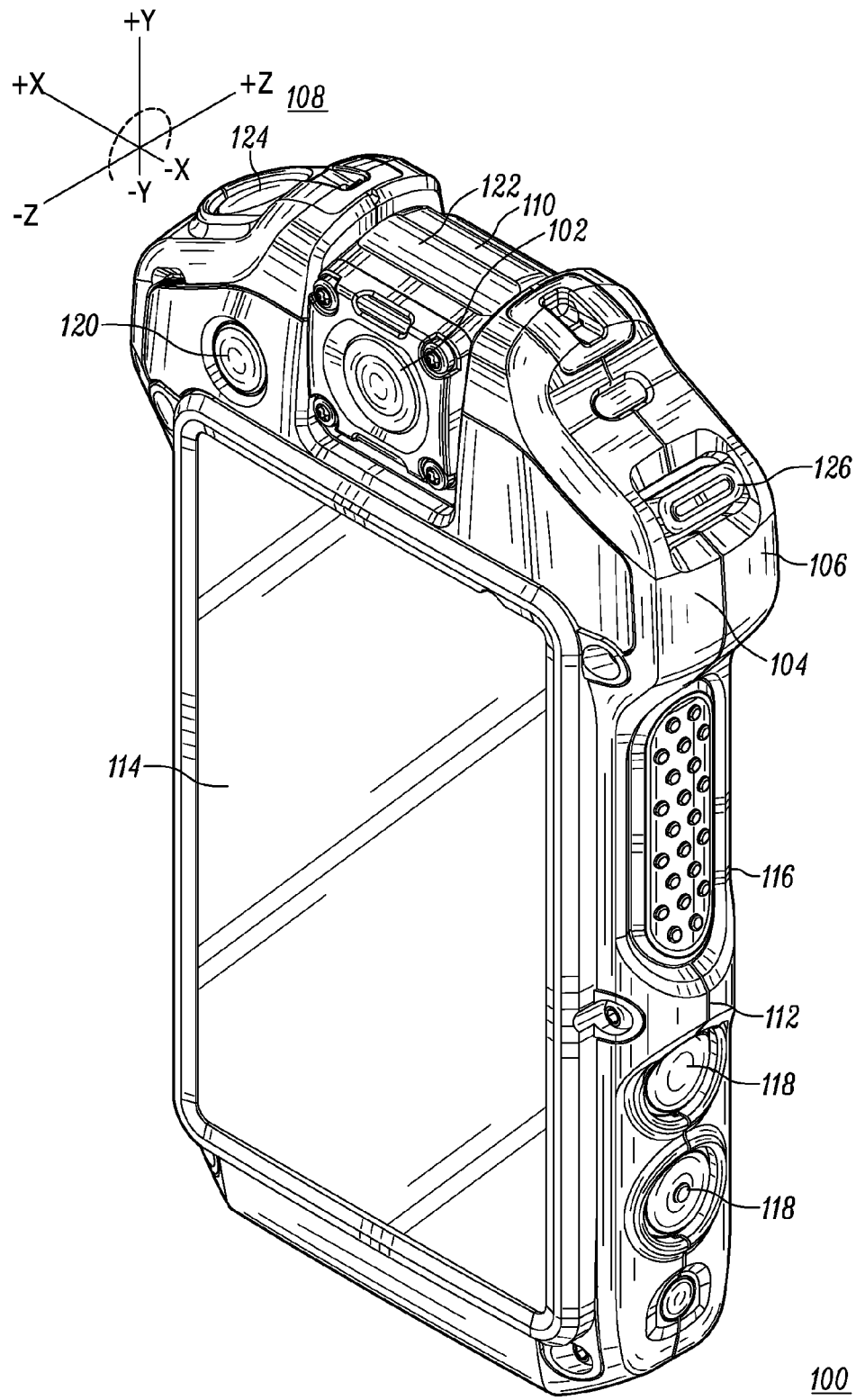
FIG. 1 is a communication device having an articulating camera formed and operating in accordance with various embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in a sealing assembly for a communication device having an articulating camera. The sealing of the articulating camera to the communication device is achieved without impacting range of camera rotation and is accomplished via a coiled flex having an extended end, a barrel hinge and a single seal. The single seal is formed to accommodate the barrel hinge and extended end of the flex while the coiled portion of the flex rotates internally to the pivot housing so as not to limit the range of rotation of the camera. Accordingly, the components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

FIG. 1 is a communication device 100 having an articulating camera 102 for capturing video formed and operating in accordance with the various embodiments. Communication device 100 comprises first and second housing halves 104, 106, housing radio electronics such as a transceiver and a controller for transmitting and receiving communications, such as audio, data, and radio frequency communications. Communication device 100 may further comprise a touch panel 114, a push-to-talk switch 116, programmable buttons 118, power button 120, emergency button 124, volume toggle 126, and speaker and microphones (for remote speaker microphone operation—not shown) and other elements suitable for public safety applications.

Communication device 100 is a portable communication device which may be operated as an accessory in conjunction (wired or wirelessly) with another communication device, such as a portable radio or may be operated as an independent stand alone device. In accordance with the various embodiments, first and second housing halves 104, 106 couple together to form a host housing 112 for retaining and providing pivot bearing surfaces for the articulating camera 102. The articulation camera capabilities of communication device 100 make it well suited for body worn shoulder applications. However, other applications may also benefit from the communication device 100, the articulating camera 102 and the sealing of the articulating camera to be described herein. Any device where a high degree of rotational range is desired for capturing video that requires ruggedness and good sealing in a small form factor can benefit from the sealing apparatus of the various embodiments.

Communication device 100 provides camera articulation in addition to field of view camera optics to capture video from various wear positions. For communication device 100, 'x' can be said to represent the width of the device, 'y' to represent the height of the device, and 'z' to represent the thickness of the device, an x, y, z axis 108 is shown to help describe rotation of the articulating camera 102. The articulation of articulating camera 102 captures video in rotations about a horizontal axis, shown as the x-axis causing the camera to move in the y-axis. The articulating camera 102 has a predetermined range of rotation controlled via a pivot housing 110 having grooved grip features 122. The pivot housing 110 having grooved grip features 122 of the articulating camera 102 is well suited to gloved usage. The articulation is most desired about the x axis in FIG. 1 not only because of the various wearing positions in shoulder usage, but also because the camera will have a narrower field of view in the vertical direction versus a horizontal direction.

The ability to protect the articulating features of the camera 102 in rugged environments is important to maintaining good communications in public safety operation in environments where wetness, smoke, and dust may be encountered. The communication device 100 provides a camera system that is protected from the environment while maintaining the camera's range of motion all within a limited form factor. The communication device 100 provides sealing and protection against wear and tear, leakage, fatigue and rotational drag along with a good electrical interconnect between the camera and the host device housing 112. The various embodiments to be described herein describe how the host device housing 112 interfaces with the articulating camera 102 in a sealed manner while retaining full articulating movement.

The environmental sealing of the communication device 100 enables usage in the public safety arena, under rainy, wet conditions and gloved usage. The articulation of the wide field of view camera into full forward or rear positions (for example 210 degrees) provides ability to have video from front and back when the device is worn at the shoulder. The fully sealed approach provided by the various embodiments is achieved by capturing the articulating camera's pivot housing 110 between the two housing halves 104, 106 and through the incorporation of a coiled flex, sealed barrel hinge and pocket seal to be described herein.

Figure 2:
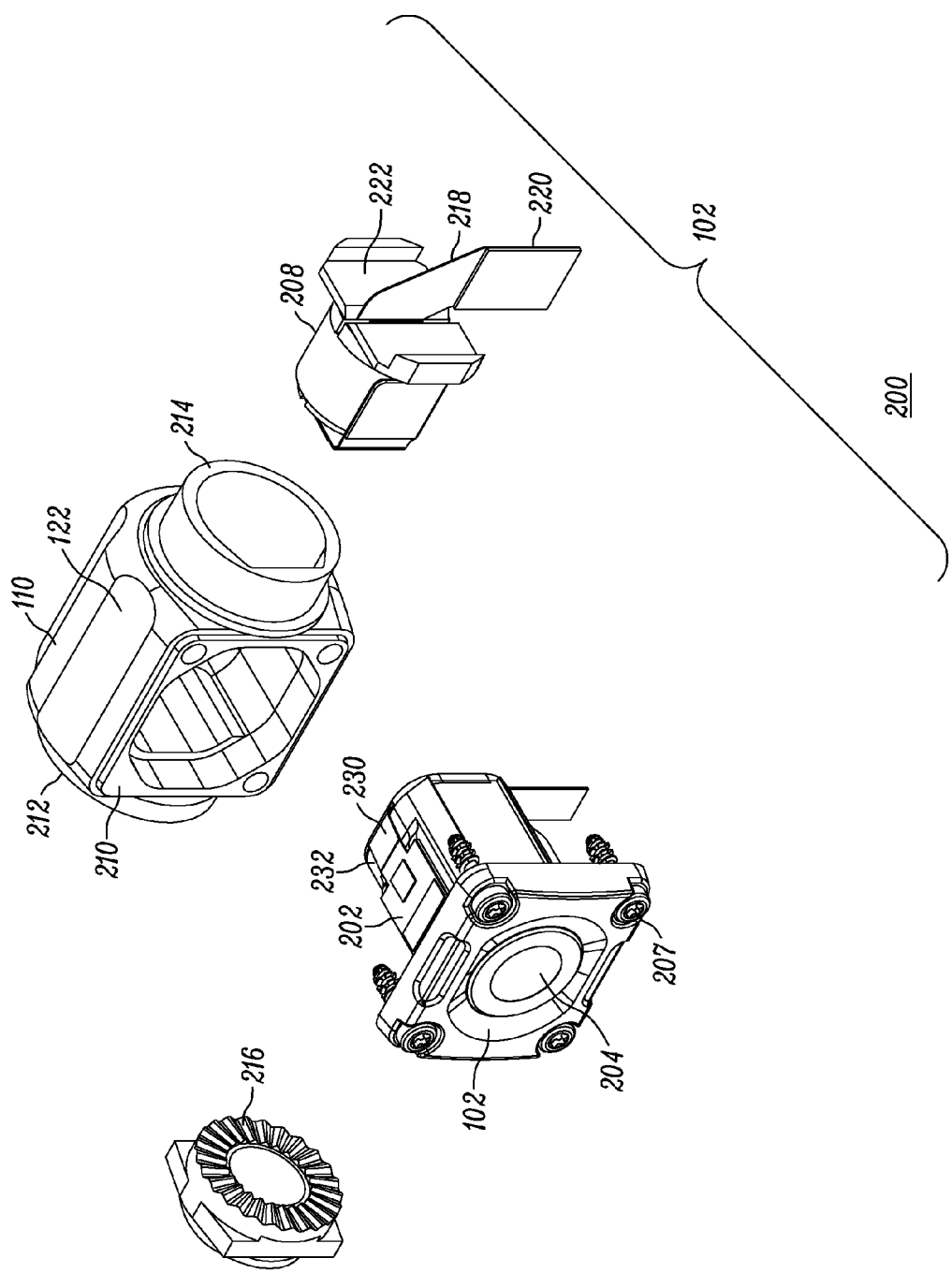
FIG. 2 is an exploded view of the articulating camera in accordance with the various embodiments.

FIG. 2 is a camera assembly 200 of the articulating camera 102 in accordance with the various embodiments. The camera assembly 200 shows an exploded view of articulating camera 102 comprising a sealed camera module 202, a coil holder 222, the pivot housing 110, and a ratchet wheel 216.

The sealed camera module 202 comprises camera electronics with lens 204. The camera internal electronics (sensor, etc.) which are sealed within the module are electronically interconnected via an external flex 230 to the host device 112 (of FIG. 1). The external flex 230 is formed of different sections comprising an initial portion that couples to and wraps about the camera body 232, a coiled flex circuit 208, a flex extension 218, and a flex interface 220. It is this external flex 230 and its various sections that is in need of sealing while maintaining rotatability of the camera and to which the various embodiments are directed. The external flex 230 is coupled the outside of the camera module, such as to an outside base 232 of the camera module 202 and runs along outer walls. The flex 230 is then brought through pivot housing 110 at opening 210 and pulled through barrel hinge 214. Then, the flex 230 is coiled as flex circuit 208 around the coil holder 222 and then re-inserted back within pivot housing 110 at barrel hinge 214, and from here the flex extension 218 and flex interface 220 protrude from the barrel hinge 214 (for connection to the host communication device 112). The sealed camera module 202 can then be inserted into the opening 210 of pivot housing 110.

In accordance with the various embodiments, the coiled flex circuit 208 is wrapped upon itself and is inserted within the barrel hinge area 214 of pivot housing 110, leaving the flex extension 218 and flex interface 220 extending therefrom. In accordance with the various embodiments, the length and number of coils of coiled flex circuit 208 determines the range of rotation of the articulating camera 102.

The pivot housing 110 has grooved grip features 122 on an outer surface which facilitates rotation for a ruggedized user interface, such as for gloved usage. Screws 207 or other mounting means can be used to couple or otherwise attach sealed camera module 202 to pivot housing 110. The pivot housing 110 comprises a first end for receiving a ratchet wheel 216 and a second end formed of a barrel hinge 214. The ratchet wheel 216 provides a detent mechanism in the articulating camera 102 for controlling positions into predetermined discrete angles implemented outside the sealed volume of the assembly. For example, 15 degree increments are shown but other discrete angle positions may also be implemented. The ratchet wheel 216 further provides a user interface feedback via audible and tactile clicks in response to rotation or pivoting of the pivot housing 110 with articulating camera 102.

The coiled flex 208 wraps around the coil holder 222 which is then inserted into the opening of barrel hinge 214 of pivot housing 110 providing space for the flex to rotate.

In summary, the articulating camera 102 of the various embodiments comprises a barrel hinge, a coiled flex circuit coupled within the pivot housing, wherein the coiled flex circuit having the flex extension extends through the barrel hinge. The articulating camera 102 further comprises the pivot housing 110 and the ratchet wheel 216. A single seal is next used for sealing these components.

In accordance with the various embodiments, the coiled flex circuit 208 allows a predetermined range of rotation with within a predetermined minimal axial space within the camera module 202. The coiled flex circuit 208 is far more advantageous than a twisting flex or twisting wire which would require much more axial (x direction) space to twist without fatigue. In accordance with the various embodiments, the coiled flex circuit 208 is coiled into a plurality of coils within the sealed pivot opening for allowing large angles of rotation without damage to flex conductors. Thus, the length (number of coils) of the coiled flex circuit 208 determines the range of rotation of the articulating camera.

Figure 3:
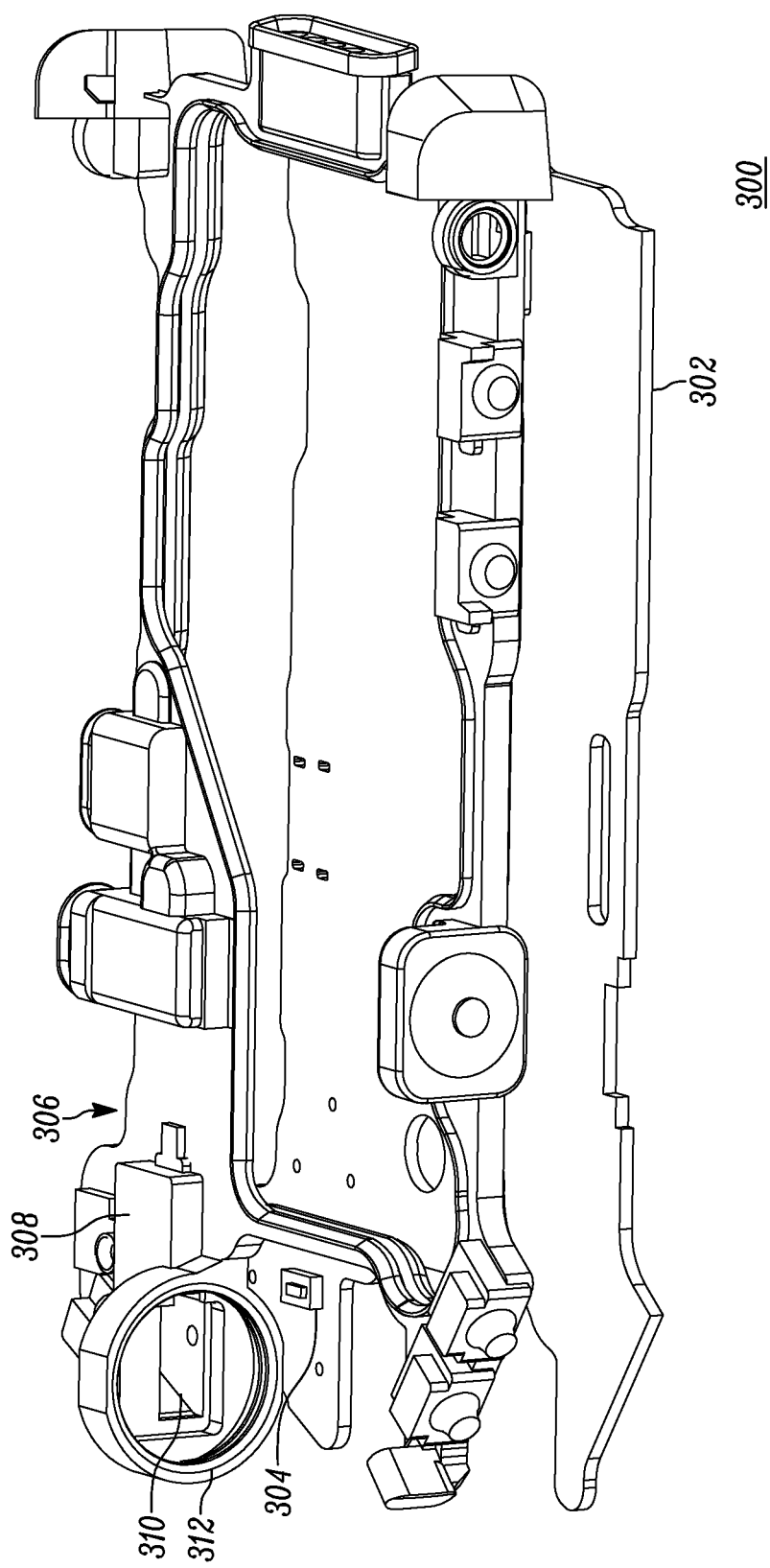
FIG. 3 is a seal formed in accordance with the various embodiments.

FIG. 3 shows partially exploded view 300 of printed circuit board and single seal in accordance with the various embodiments. View 300 shows printed circuit board (pcb) 302 having a flex connector 304 mounted thereon. The printed circuit board may be made of FR-4 or other circuit board material suitable for handling radio communication circuitry. Circuit board 302 may also be referred to as a main pcb, a radio pcb or a host device pcb. A single seal 306 is molded to surround the main pcb 302 and includes a pocket 308 molded therein for flex connector 304. The pocket for flex connector 304 leads to a flex access path 310 which further provides a circumferential seal 312 for barrel hinge 214 of pivot housing 110.

For assembly purposes, the single seal 306 can be mounted to the pcb 302 and then the flex extension from the camera can be threaded through the circumferential seal 312, through the flex access path 310 and pocket 308 and attached to the flex connector 304 of the pcb 302.

Figure 4:
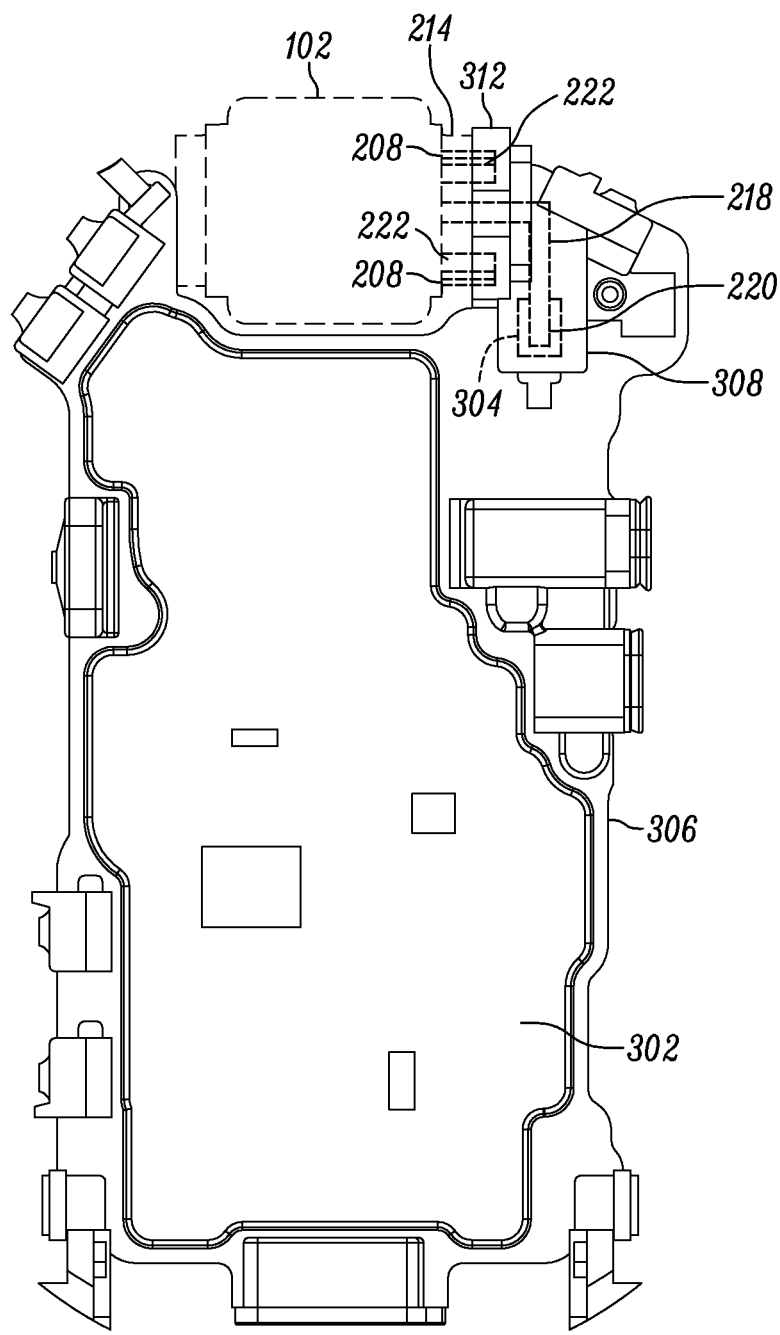
FIG. 4 shows the single seal for sealing the printed circuit board and extended flex in accordance with the various embodiments.

FIG. 4 shows the single seal 306 sealing the printed circuit board 302 and extended flex 218 in accordance with the various embodiments. As seen in this view, the coiled flex circuit 218 is wrapped around the coil holder 222 which is inserted into barrel hinge 214. The ratchet end is a closed off end and this no sealing is required at that end of articulating camera 102.

The single seal 306 is formed to have the circumferential seal 312 for sealing the barrel hinge 214 of the articulating camera 102, flex access path 310 providing a passageway for flex extension 218 leading into pocket 308 for sealing the flex connector 304 located on pcb 302. A closed sealed assembly is formed between the coiled flex circuit 208 through to the pcb 302 using a single seal 306 while maintaining range of rotation of the camera. The length of the coiled flex circuit 208 and number of coils determines the range of rotation of the articulating camera 102.

The single seal 306 may be formed of silicone rubber having high accuracy, high heat resistance, and excellent tear strength and elongation properties, Shore Hardness scales are measurements which allow for measuring the hardness of different materials. These scales were invented so that people can discuss these materials and have a common point of reference. The Shore A00 Scale measures rubbers and gels that are very soft. The Shore A Hardness Scale measures the hardness of flexible mold rubbers that range in hardness from very soft and flexible, to medium and somewhat flexible, to hard with almost no flexibility at all. Single seal 306, may be formed of, for example, silicone 60 Durometer shore A, as a suitable material. This type of seal material minimizes drag on the barrel hinge 214 allowing it to rotate within its full range while sealing the flex extension 218 and flex interface 220. The single seal 306 has stretch and conformable properties making it ideal for sealing the moving assembly such as the articulating camera 102 of the various embodiments.

Other properties pertaining to the single seal 306 as it pertains to sealing of the remainder of the pcb 302 can be found in commonly assigned, co-pending U.S. patent application Ser. No. 14/886,568 entitled "SEALING SYSTEM AND METHOD FOR SEALING OF ELECTRONICS HOUSINGS." For example, the sealing structure for an electronics substrate disposed in an electronics housing, comprising a one-piece sealing member configured to engage a perimeter surface of the electronics substrate, the one-piece sealing member including a perimeter seal portion configured to engage the perimeter surface of the electronics substrate; a first seal portion configured to engage a first substrate surface of the electronics substrate; and a second seal portion configured to engage a second substrate surface of the electronics substrate.

For the purposes of the present application and in accordance with the embodiments, the sealing of the present application pertains to the sealing of an interconnect between a movable piece part (the articulating camera) and the pcb 306 of host device 112. The ability to maintain rotation while providing sealing to the pcb 306 is one of the advantages provided by the various embodiments.

Figure 5:
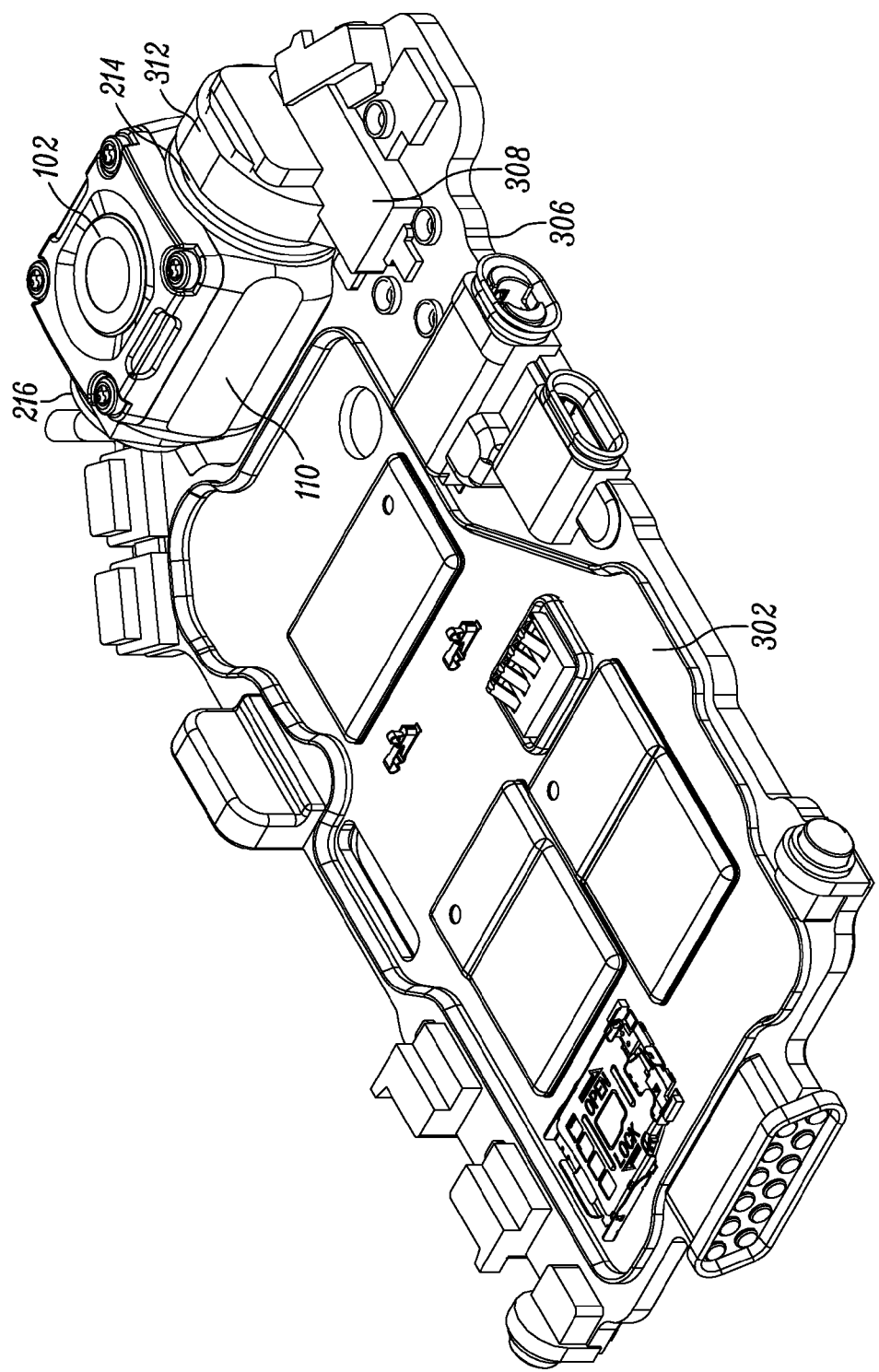
FIG. 5 is a partially assembled view of a communication device in accordance with the various embodiments.

FIG. 5 is a partially assembled view 500 of the communication device 100 formed in accordance with the various embodiments. In this view the articulating camera 102 with pivot housing 110 is coupled to the pcb 302 via the barrel hinge 214 and circumferential seal 312. Drag on the seal can be minimized by either using an oil bleeding silicone or by applying lubricant in the barrel hinge area. Pocket 308 internally seals and protects the flex extension 218, flex interface 220 and flex connector 304 coupled thereto seen in other views. Ratchet wheel 216 is not connected to the pcb 302. The next facet of assembly involves bringing in the first and second housing halves 104, 106 which were seen in FIG. 1. In accordance with various embodiments, the single seal 306 is shown sealing along opposing surfaces of the (host) pcb 302, such as a radio pcb, along a perimeter edge.

Figure 6:
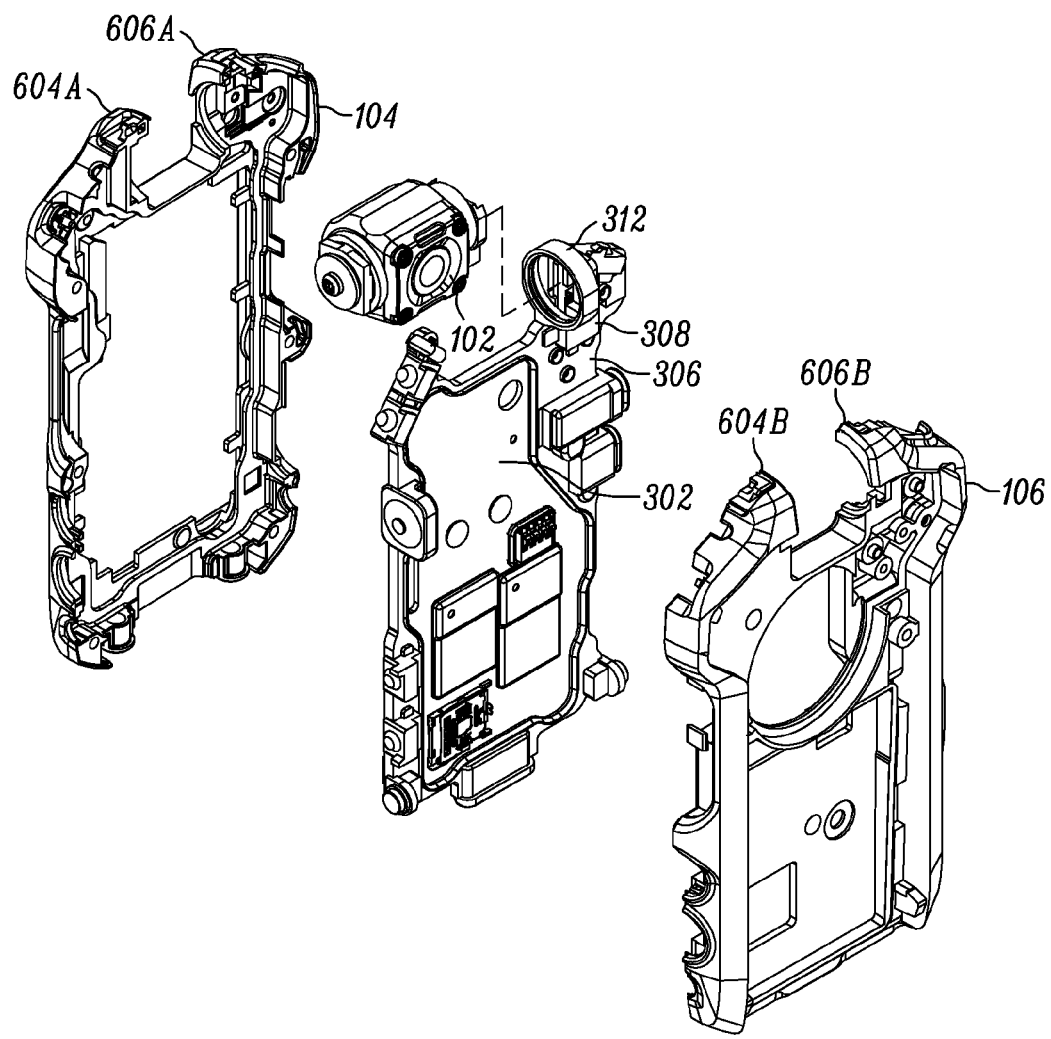
FIG. 6 is a partially exploded view of the communication device formed in accordance with the various embodiments.

FIG. 6 is a partially exploded view of the communication device 100 formed in accordance with the various embodiments. The first and second housing halves 104, 106 are outer housing halves which form first and second bearing pivot surfaces 604A, 604B and 606A, 606B. The first bearing pivot surface 604A, 604B captures the ratchet wheel 216 while the second bearing pivot surface 606 A, 606B captures the barrel hinge 214 within the circumferential seal 312. Thus, the pivot housing having the barrel hinge is captured and rotatably coupled by the first and second bearing surfaces.

The environmental sealing of the communication device 100 enables usage in the public safety arena, under rainy, wet conditions and gloved usage. The assembly of the various embodiments provides for a pivoting camera that is clearly advantageous in the field of body worn cameras, and even as a stand-alone communication device. The articulation of the wide field of view camera into full forward or rear positions provides ability to have video from front and back when the device is worn at the shoulder. The fully sealed approach provided by the various embodiments is achieved without adding any additional sealing parts and is captured by pivoting the camera between two housing halves and through the incorporation of the coiled flex, and single seal providing for a sealed barrel hinge and pocket seal.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. A communication device, comprising:
    a first housing half;
    a second housing half, the first and second housing halves providing and first and second bearing surfaces of a host device;
    an articulating camera comprising a camera module inserted within a pivot housing, the pivot housing comprising a barrel hinge captured and rotatably coupled by one of the first and second bearing surfaces;
    a coiled flex circuit providing electrical interconnect between the articulating camera and the host device, the coiled flex circuit having a flex extension extending from the pivot housing through the barrel hinge to the host device; and a single seal sealing the pivot housing to the host device, the single seal having an opening coupled to the barrel hinge, the coiled flex circuit threading from the pivot housing through the first barrel hinge through the opening of the seal into the host device to couple to a flex connector of the host device, the flex connector being sealed by the single seal.

2. The communication device of claim 1, wherein the coiled flex circuit provides a predetermined rotation within a predetermined minimal axial space.

3. The communication device of claim 1, wherein the pivot housing further comprising:
a detent mechanism for controlling positions into discrete angles.

4. The communication device of claim 1, wherein the coiled flex circuit is coiled into a plurality of coils allowing large angles of rotation without damage to flex conductors.

5. The communication device of claim 1, where the pivot housing further comprises:
a ratchet wheel; and
the barrel hinge and ratchet wheel are captured by assembly of the first and second housing halves of the host device.

6. The communication device of claim 1, wherein the opening of the single seal is formed as a circumferential seal for coupling to the barrel hinge of the pivot housing.

7. A communication device, comprising:
a radio housing, comprising:
a radio printed circuit board (pcb) having a flex connector coupled thereto;
a single seal mounted to the radio pcb, the single seal providing a pocket for sealing the flex connector and a flex access path to the pocket;
an articulating camera, comprising:
a sealed camera module within a pivot housing, the sealed camera module having a coiled flex circuit coupled thereto, the coiled flex circuit having a flex extension;
a barrel hinge formed a part of the pivot housing, the barrel hinge for mounting to the radio housing; and
wherein the flex extension extends through the barrel hinge into the flex access path of the single seal to mate with the flex connector within the pocket of the single seal on the radio pcb; and
the single seal sealing the radio pcb, the flex connector, the flex extension, and the barrel hinge of the pivot housing.

8. The communication device of claim 7, wherein the single seal further seals along opposing surfaces of the radio pcb along a perimeter edge.

9. An assembly, comprising:
an articulating camera comprising a camera module within a pivot housing having a barrel hinge;
a communication device housing for capturing and rotatably coupling the articulating camera via the barrel hinge;
a coiled flex circuit coupled within a camera module of the pivot housing, the coiled flex circuit having a flex extension extending through the barrel hinge of the pivot housing;
a printed circuit board (pcb) within the communication device housing, the flex extension of the coiled flex circuit being coupled to the pcb; and
a single seal for sealing the pcb of the communication device housing, the flex extension, and the barrel hinge of the pivot housing.

10. The assembly of claim 9, wherein the single seal comprises a circumferential seal for sealing the barrel hinge of the pivot housing.

11. The assembly of claim 9, further comprising:
a flex interface coupled to the flex extension of the coiled flex circuit;
a flex connector coupled to the pcb for receiving the flex interface of the flex extension; and
the single seal comprises a pocket for sealing the flex connector of the pcb having the flex interface received therein.

12. The assembly of claim 9, wherein the coiled flex circuit within the pivot housing provides a predetermined range of rotation determined by a length and number of coils of the coiled flex circuit.

13. The assembly of claim 9, wherein the pivot housing further comprises a grooved surface.

14. The assembly of claim 13, wherein the grooved surface of the pivot housing enables gloved usage.

15. The assembly of claim 9, wherein the pivot housing further comprises:
a ratchet wheel opposite the barrel hinge.

16. The assembly of claim 15, wherein the ratchet wheel generates tactile feedback as the pivot housing is rotated.

17. The assembly of claim 16, wherein the coiled flex circuit has a length and a number of coils that determine a range of rotation of the articulating camera.

18. The assembly of claim 9, wherein the single seal is formed of silicone 60 durometer shore A material.

\* \* \* \* \*